United States Patent [19]
Yamaguchi et al.

[11] Patent Number: 5,182,833
[45] Date of Patent: Feb. 2, 1993

[54] VACUUM CLEANER

[75] Inventors: Seiji Yamaguchi, Shiga; Masaru Moro; Saburou Kajikawa, both of Youkaichi; Masahiro Kimura, Shiga; Hideo Okubo, Youkaichi; Tadashi Matsuyo, Youkaichi; Hiroshi Kawakami, Youkaichi, all of Japan

[73] Assignee: Matsushita Electric Industrial Co., Ltd., Osaka, Japan

[21] Appl. No.: 518,402

[22] Filed: May 3, 1990

[30] Foreign Application Priority Data

| May 11, 1989 | [JP] | Japan | 1-118250 |
| May 23, 1989 | [JP] | Japan | 1-130409 |
| May 23, 1989 | [JP] | Japan | 1-130412 |
| Aug. 18, 1989 | [JP] | Japan | 1-213376 |

[51] Int. Cl.⁵ .................................. A47L 9/28
[52] U.S. Cl. ............................. 15/319; 15/339
[58] Field of Search ...................... 15/319, 339

[56] References Cited

U.S. PATENT DOCUMENTS

| 4,601,082 | 7/1986 | Kurz | 15/319 |
| 4,680,827 | 7/1987 | Hummel | 15/319 |
| 4,920,605 | 5/1990 | Takashima | 15/319 |
| 4,942,640 | 7/1990 | Hayashi et al. | 15/319 |

FOREIGN PATENT DOCUMENTS 0217216 4/1987 European Pat. Off. .
2197555 3/1974 France .

Primary Examiner—Chris K. Moore
Attorney, Agent, or Firm—Pollock, VandeSande & Priddy

[57] ABSTRACT

A vacuum cleaner has a blower motor; a dust detector responsive to a sucked dust particle due to rotation of the blower motor for producing a dust detecting signal when each of the dust particles is detected passing a portion in a suction passage; counter responsive to the dust detection signal for counting the number of the dust interception particles for a given interval; and input power controller responsive to an output signal of the counter for controlling the input power of the blower motor by selecting an input power value from plural preset input power values in accordance with the number. Controlling input power may be performed in accordance with a pulse width indicative of the dust particle size or the counted number may be modified by pulse width. Another embodiment of the vacuum cleaner has plural light emitting diodes for indicating the number counted to show an operator uncleanliness of the floor. The controller includes a microprocessor which can control a thyristor provided in series with the blower motor directly. In a vacuum cleaner where the thyristor is located in the housing, the microprocessor may be located in a handle portion, and a D/A converter and a phase control circuit may be provided in the housing.

21 Claims, 16 Drawing Sheets

FIG. 4
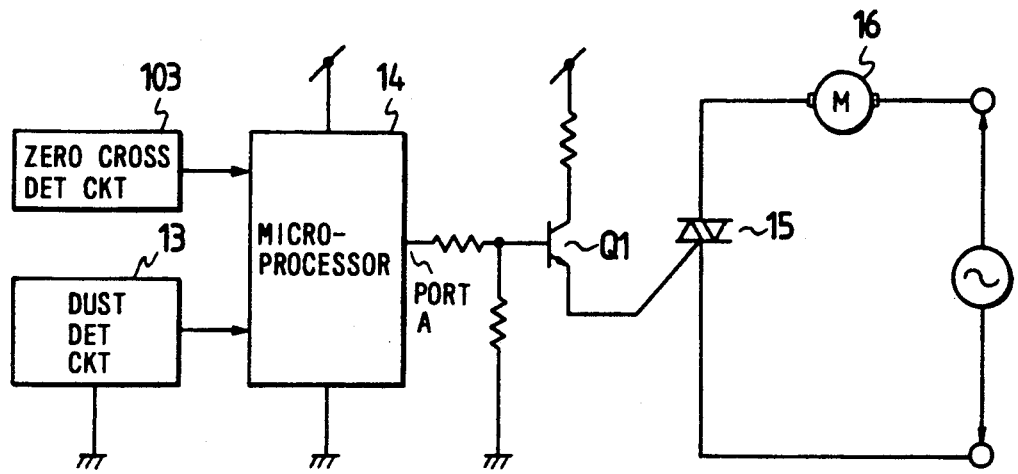
FIG. 5A
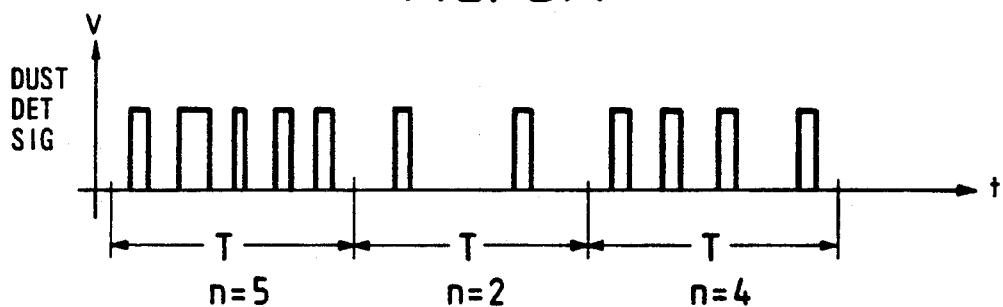
FIG. 5B
| NUMBER OF PULSES | INPUT POWER |
|---|---|
| $0 < n < n_1$ | $P_1$ |
| $n_1 < n < n_2$ | $P_2$ |
| $n_2 < n < n_3$ | $P_3$ |
| $n_{n-1} < n < n_n$ | $P_n$ |

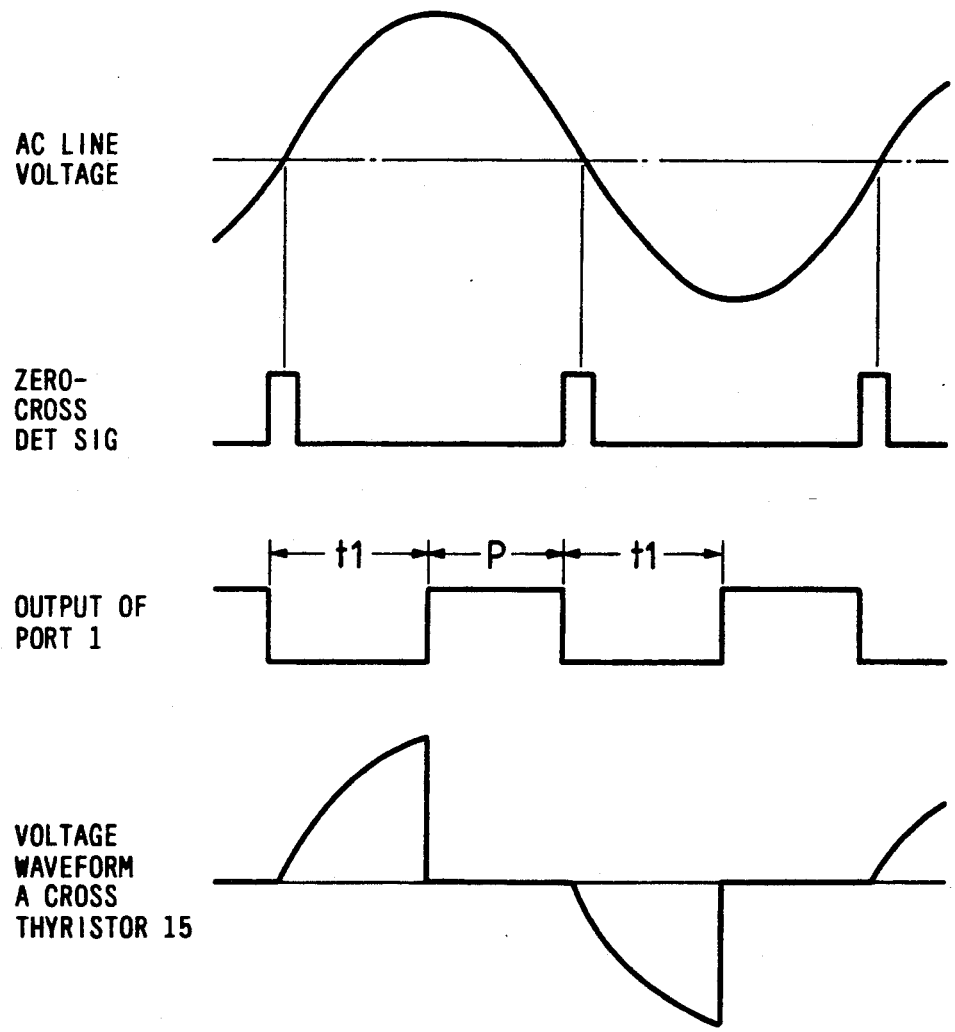

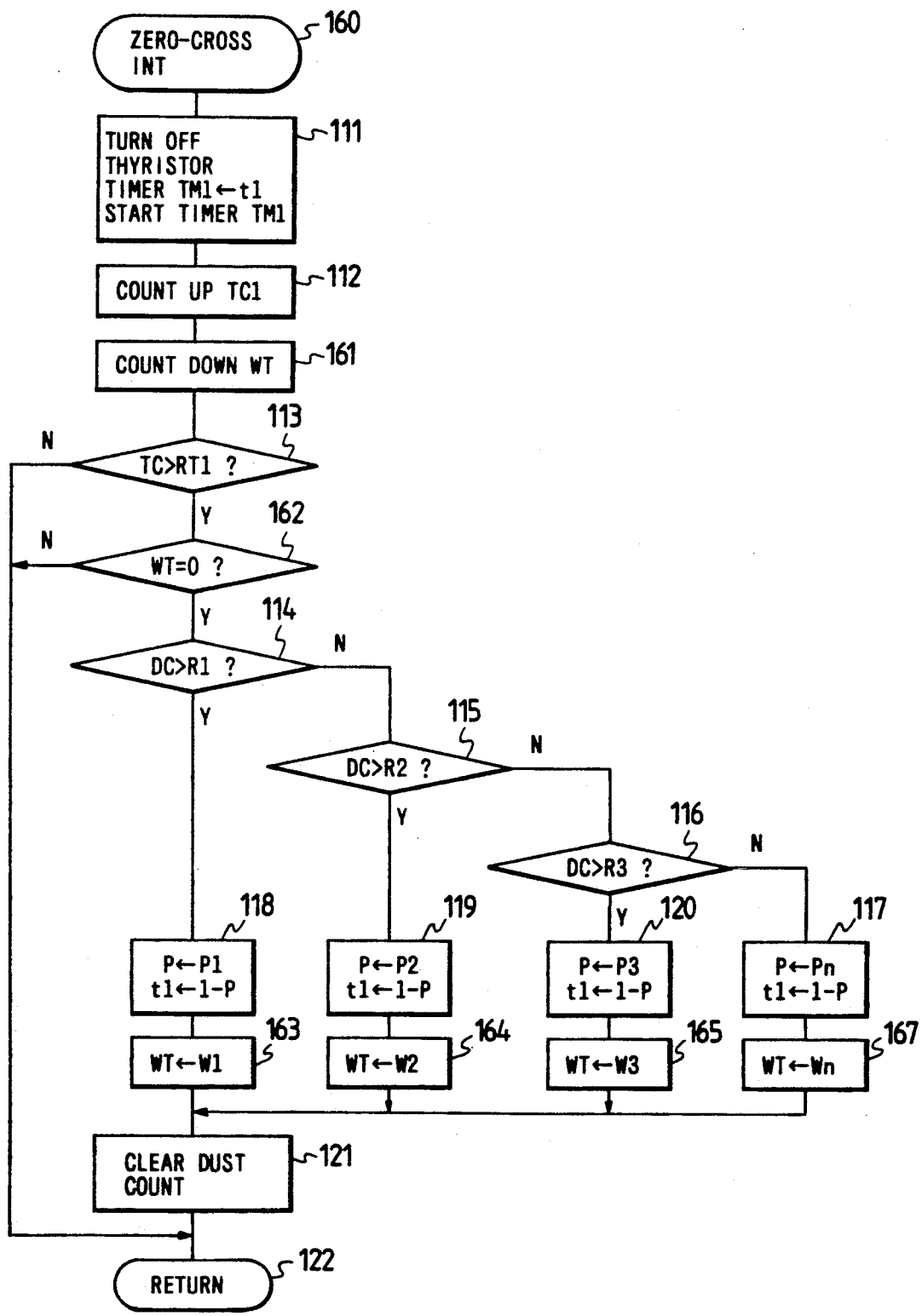

VACUUM CLEANER

BACKGROUND OF THE INVENTION

1. Field of the Invention

This invention relates to a vacuum cleaner.

2. Description of the Prior Art

A vacuum cleaner is known which comprises a dust sensor provided in a passage for sucking air and a controlling circuit for controlling the suction force in accordance with a detection signal from the dust sensor.

Such prior art vacuum cleaner is described in U.S. Pat. No. 4,801.082. However, in the above-mentioned prior art vacuum cleaner, the suction force is changed stepwise between high and low values. Thus, there is a drawback that the suction force is not proportionally varied with the degree of uncleanliness of the floor, i.e., the amount of dust to be sucked so that the suction force increases excessively if uncleanliness exceeds a given level.

SUMMARY OF THE INVENTION

The present invention has been developed in order to remove the above-described drawbacks inherent to the conventional vacuum cleaner.

According to the present invention there is provided a vacuum cleaner comprising: a blower motor; a dust detector responsive to a dust particles sucked by to rotation of the blower motor for producing a dust detection signal when the dust particles pass through a portion of a suction passage a counter responsive to the dust detection signal from the dust detector for counting the number of dust particles for a given interval; and an input power controller responsive to an output signal of the counter for controlling input power of the blower motor in accordance with the number.

According to the present invention there is also provided a vacuum cleaner comprising: a blower motor; a dust detector responsive to dust particles sucked by rotation of the blower motor for producing a dust detection signal when the dust particles pass through a portion of a suction passage; a pulse width detector responsive to a dust detection signal from the dust detection means for detecting the pulse width of the dust detection signal; and an input power controller responsive to an output signal of the counter for controlling input power in accordance with the width of the pulse.

According to the present invention there is further provided a vacuum cleaner comprising: a blower motor; a dust detector responsive to dust particles sucked by rotation of the blower motor for producing a dust detection signal when the dust particles pass through a portion of a suction passage; a counter responsive to a dust detection signal from the dust detector for counting the number of the dust particles for a given interval; a pulse width detector responsive to a dust detection signal from the dust detector for detecting the width of a pulse caused by a dust particle passing the portion; and on input power controller comprising a modify circuit responsive to output signals of the counter and the pulse width detector for controlling input power of the blower motor in accordance with the number modified by the width.

According to the present invention there is further provided a vacuum cleaner comprising: a housing having: a blower motor; an input power controller responsive to a control signal for controlling input power of the blower motor; and a handle portion having: a dust detector responsive to a dust particles sucked by rotation of the blower motor for producing a dust detection signal when the dust particles passing through a portion of a suction passage; and a counter responsive to the dust detection signal from the dust detector for counting the number of the dust particles for a given interval to produce a control signal indicative of the number of dust particles.

BRIEF DESCRIPTION OF THE DRAWINGS

The object and features of the present invention will become more readily apparent from the following detailed description taken in conjunction with the accompanying drawings in which:

FIG. 4 is a block diagram of the first embodiment which is common to the first—sixth embodiments;

FIG. 5A is an explanatory diagram of the first embodiment showing a waveform of the dust detection signal;

FIG. 5B is a conversion table used in the first embodiment.

FIG. 5C shows waveforms for controlling input power of FIG. 4;

FIG. 8 shows a flow chart of the second embodiment;

The same or corresponding elements or parts are designated with like references throughout the drawings.

DETAILED DESCRIPTION OF THE INVENTION

Figure 1:
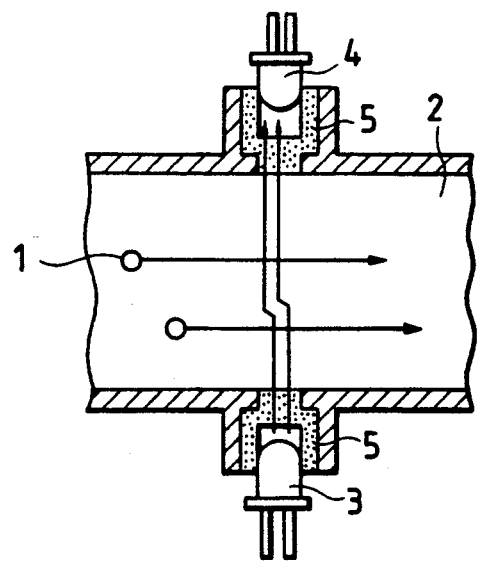
FIG. 1 is a cross-sectional view of an optical dust detection portion.
Figure 2:
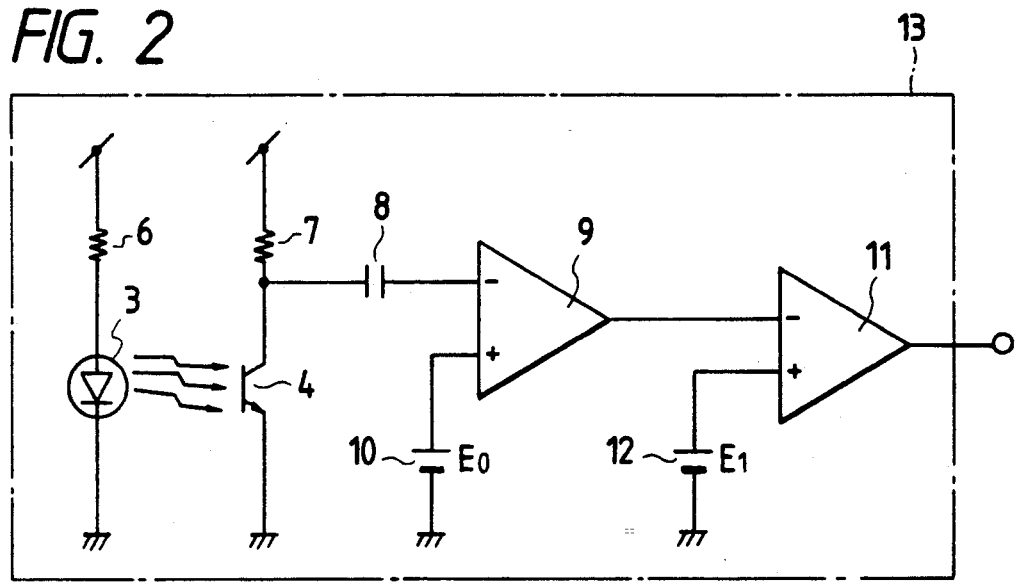
FIG. 2 is a block diagram of a dust detection circuit for a first embodiment of the invention.

Referring now to the drawings. FIG. 1 is a cross-sectional view of an optical dust detection portion and FIG. 2 is a block diagram of a dust detection circuit for a first embodiment of the invention. FIG. 4 is a block diagram of the first embodiment which is common to the first through sixth embodiments of the invention.

In FIG. 1, a light emitting device (LED) 8 and light sensitive device 4 are provided on a portion of suction passage 2 where a dust particle 1 passes. The light emitting device 3 and light sensitive device 4 face each other. The light emitting devices and light sensitive devices 4 are supported by respective transparent holders 5, which are provided for shielding air and light transmission. FIG. 2 is a schematic circuit diagram of a dust detection circuit 13. In FIG. 2, a current is provided to the light emitting device 3 through a resistor 6 from a dc power supply. To continuously power the light emitting device 3. The light sensitive device 4 (hereinbelow referred to as a phototransistor) receives the light signal from the light emitting device 3. A collector terminal of the phototransistor 4 is connected to and biased by a resistor 7. The collector output of the phototransistor 4 is coupled to a minus input of an amplifier 9 through a capacitor 8 for cutting off a direct current. A plus input of the amplifier 9 is connected to a reference potential 10. Therefore, the amplifier 9 produces an output signal varying around potential $E_\square$ of a reference voltage 10 wherein only the variation of collector potential of the phototransistor 4 (ac component) is amplified. A minus input terminal of a comparator 11 is connected to an output terminal of the amplifier 9. A plus input thereof is connected to a reference potential 12. An analog output signal of the amplifier 9 is compared with the reference potential $E_1$ for waveform shaping. The operation of the above-mentioned structure is described hereinbelow.

When a dust particle 1 passes across a light path between the light emitting device 3 and phototransistor 14, the light path between the light emitting device 3 and phototransistor 4 is interrupted, so that the base current of phototransistor 4 decreases and, thus, its collector potential increases. A potential changing component with variation in light intensity is amplified through the capacitor 8 around the reference potential $E_\square$ to detect the light intensity change by the dust particle 1 as an analog signal. When the detected analog signal decreases under the reference potential $E_1$, an output signal of the comparator 11 changes to H. As mentioned, the analog signal indicative of light intensity change is converted into a digital signal, i.e., a pulse signal or dust detection signal, is generated, with the following correlation. The dust detection signal indicates interception of the light path between the light emitting device 3 and phototransistor 14.

Figure 3:
FIG. 3 shows a waveform of a dust detection signal of the first embodiment.

When a small dust particle passes across the light path, the width of a pulse, such as pulse 101 of FIG. 3 is short. This is because the time interval necessary for the dust particle to pass through the light path is short. On the other hand, in the case of a large dust particle, for example, a paper scrap, the width of the pulse, such as pulse 102 of FIG. 3, is large. Moreover, the change of dust count correspondingly indicates a relative change of the density of dust passing through the suction passage 2 as there is an increasing function between the dust count per unit of time interval T and the density of dust passing through the suction passage 2. This is due to the fact that although the dust sensor 13 cannot distinguish individual ones of the plurality of dust particles passing through the light beam from the emitting diode 1 to the photodetector 2 at the same instant of time, the probability of the dust particles passing through the light beam overlapping each other is considered constant and there is a relationship between the dust density and the number of times the light path between the light emitting device 3 and the photodetector 14 is intercepted by at least a dust particle.

FIG. 4 is a block diagram of a vacuum cleaner using the above-mentioned dust detection circuit 13. In FIG. 4, the pulse signal produced by the dust detection circuit 13 is inputted into a microprocessor 14 as a control means. The microprocessor 14 counts the pulses in response to the dust detection signal from the dust detection circuit 13 and detects the number of pulses inputted for a given time interval T. For example, as shown in FIG. 5A, for a waveform of the dust detection signal, five, two, and four pulses are inputted for successive given time interval T respectively. In FIG. 5A, T is about 0.1 seconds. The microprocessor 14 selects input power values for the blower motor 10 from $P_1 \sim P_n$ in accordance with the count number n of pulses inputted for the given interval, the pulse counts n are shown in FIG. 5B, which represents a data table stored in the ROM of the microprocessor 14 The microprocessor 14 controls a gate of a bi-directional thyristor 15 through a transistor Q1 responsive to port A thereof. M microprocessor 14 operates in response to the dust detection signal and an output signal of a zero-cross detection circuit 103 to control the input power to a blower motor 16 by phase controlling, as shown in FIG. 5C. according to a program stored in the microprocessor 14. The zero-cross detection circuit 103 detect when ac line voltage crosses zero volts. In most foreign countries, including such as for example Japan for whence the inventors conceive the instant invention, it is well known that the frequency of the AC line voltage is 50 Hz. In Japan, however, the frequency and the AC line voltage could be either 50 Hz or 60 Hz, depending on whether it is the eastern portion (50 Hz) or the western portion (60 Hz) of Japan.

Figure 6A:
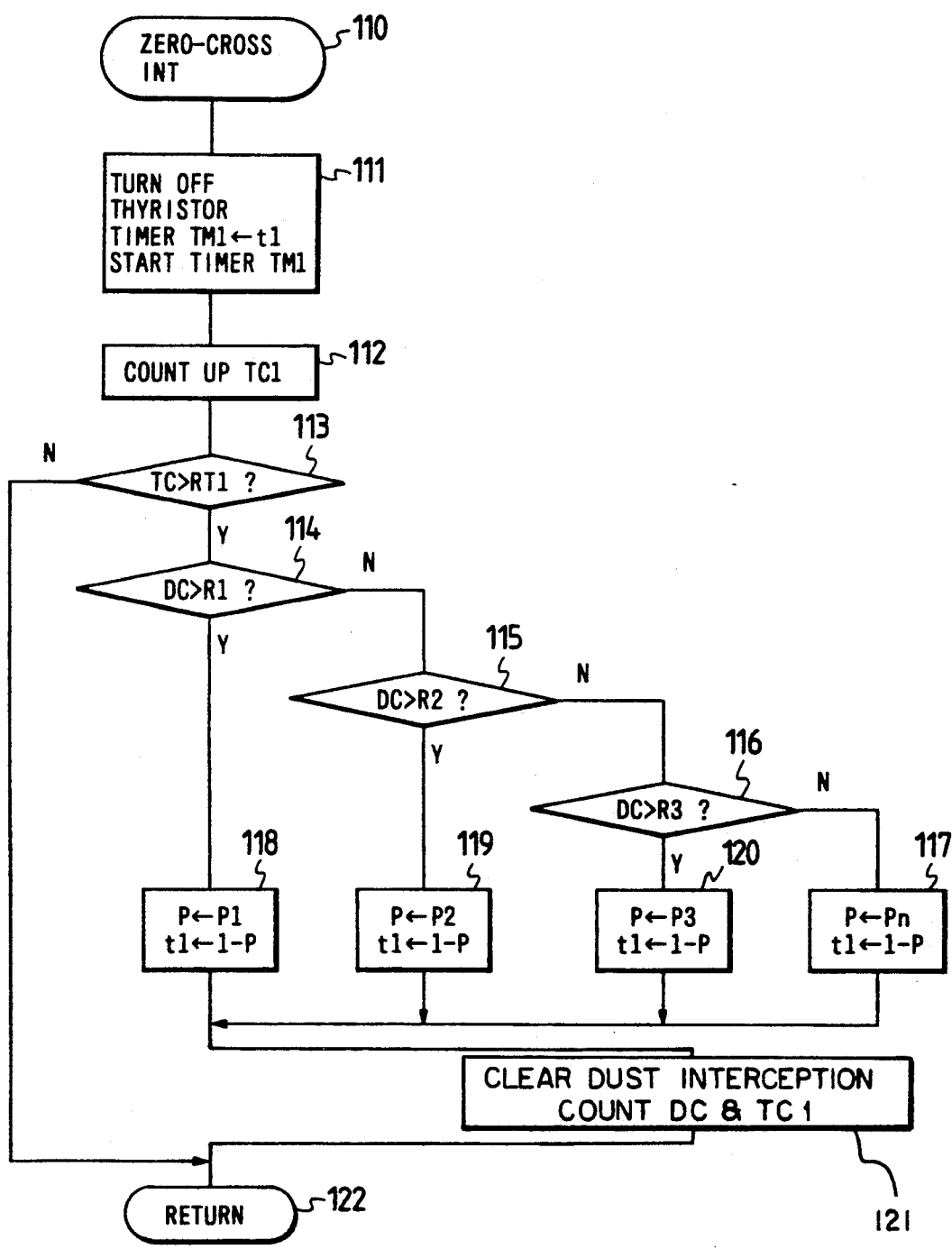
FIG. 6A shows a flow chart of the first embodiment.

As shown in FIG. 6A, the microprocessor 14 operates as follows.

Figure 6B:
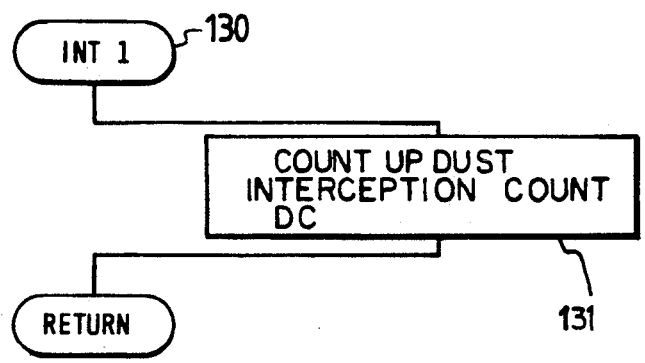
FIGS. 6B and 6C are partial flow charts of the first embodiment.
Figure 6C:
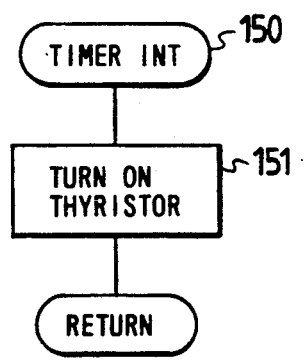

When an operator turns on the vacuum cleaner, the microprocessor 14 initializes. For example it clears a memory resets thyristor 15 and sets an initial time interval value for time TM1. Timer TM1 produces timer interrupts. Microprocessor 14 further enables the zero-cross interrupt and interrupt INT1 in an unshown main routine. Then microprocessor 14 waits for interrupts in the main routine. In response to an output signal of the zero-cross detection circuit 103, the microprocessor 14 starts zero cross interrupt at step 110 shown in FIG. 6A. In response to the dust detection signal, the microprocessor 14 starts interrupt INT1 processing 130 shown in FIG. 6B and counts the number of dust particles DC in step 131. Processing then returns to the main routine. In response to a timer interrupt timer INT starts in step 150, as shown in FIG. 6c and in the next step 151, the microprocessor 14 turns on thyristor 15.

At every zero-crossing of ac line voltage, as for example for an AC line voltage operating at 50 Hz, the microprocessor 14 effects a zero-cross interrupt in step 110. In the following step 111, the microprocessor 14 turns off thyristor 15 and sets a timer TM1 to +L. Timer TM1 is built in the microprocessor 14. Then, the timer TM1 is initiated. This causes a timer TM1 interrupt when the interval corresponding the initial value set in the main routine has passed. In the succeeding step 112 the microprocessor 14 counts the time count TC, which is indicative of the number of zero-crossing of ac line voltage. In the next step, a decision is made as to whether time count TC exceeds a reference value RT1. If the time count TC does not exceed RT1, processing returns to the main routine. If the time count TC1 exceeds RT1, processing proceeds to step 114.

This means that the time interval for counting the number of dust particles has passed. In step 114, a decision is made as to whether the dust count DC exceeds a reference value R1. If the dust count DC exceeds a reference value R1, input power constant P1 is set to a variable P in step 118; and the microprocessor 14 subtracts P from one to obtain an off-interval $t_1$ of the thyristor 15. Thus, interval t1 shown in FIG. 5C is changed in accordance with dust count DC. If the dust count DC does not exceed R1, processing proceeds to step 115. In succeeding steps 115 and 116, a decision similar to the step 114 is made. A correspondingly given input power constant P1, P2, P3, or P4 is set to the variable P where R1>R2>R3 and P1>P2>P3>P4. Thus, the greater the number of dusts detected for a given interval, as indicated by time count TC1, the larger the input power for the blower motor 10. In the succeeding step 121 of steps 118, 110, 120, and 117, the microprocessor 14 clears dust count DC and time count TC1 Then processing returns to the main routine. Thus, the thyristor 15 is turned off in step 111 and turned on in step 151; and the interval t1 indicative of off-state is determined (1-P1), (1-P2), and (1-P) in accordance with the number of dust detected for the given interval.

Figure 7A:
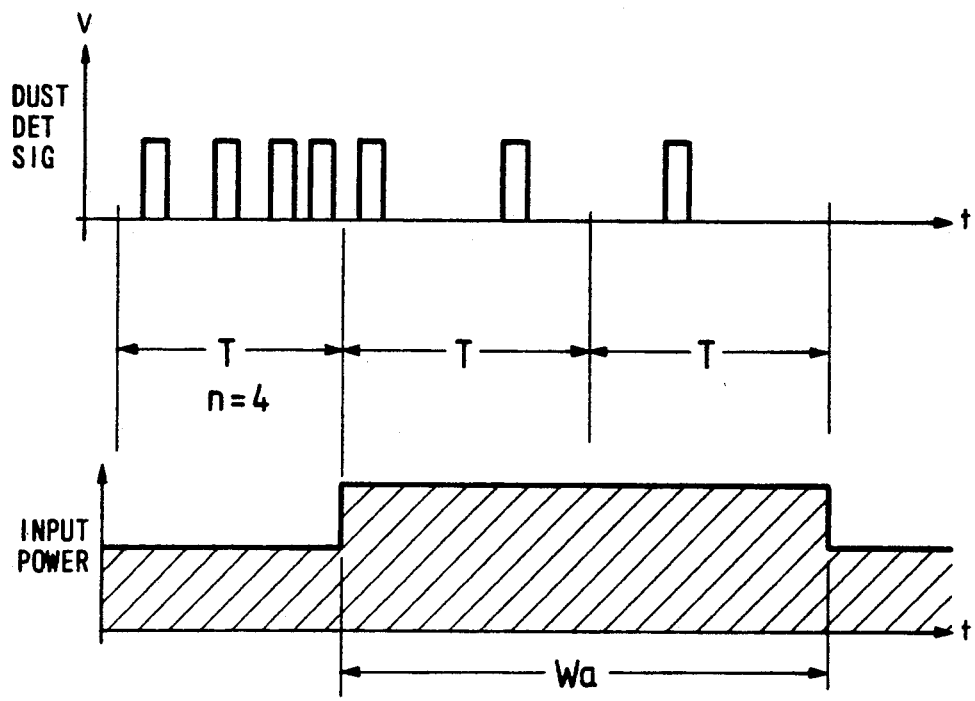
FIGS. 7A and 7B show control of a second embodiment.
Figure 7B:
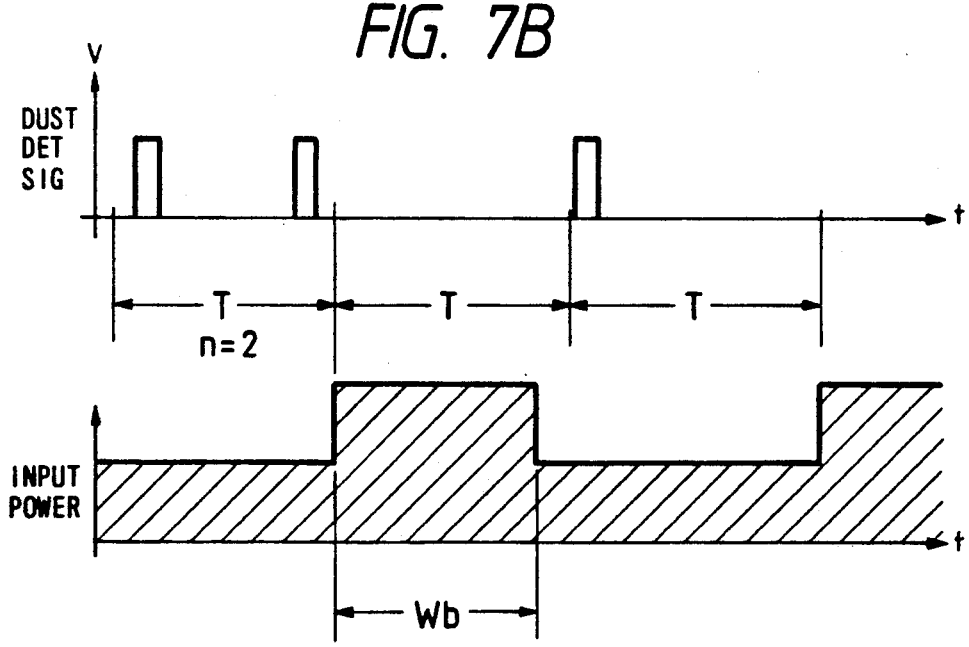

Hereinbelow will be described a second embodiment of a vacuum cleaner. Structure of the second embodiment is basically the same as the first embodiment. The only difference is that processing is executed in accordance with the flow chart of FIG. 8. FIGS. 7A and 7B show control of a second embodiment of the invention. The microprocessor 14 counts the pulses of the pulse signal generated by the dust detection circuit 13 for a given interval T. The microprocessor 14 changes input power for the blower motor 16 in accordance with the number of the counted pulses and changes the time interval of for maintaining respective input power values correspondingly.

In an example of FIG. 7A, input power of a given value is maintained for an interval Wa corresponding to the four pulses inputted for a first interval T because four pulses are generated for the first interval T. In an example of FIG. 7B, a given input power is maintained for an interval Wb corresponding to two pulses because two pulses are generated for the first interval T. An interval W where Wa>Wb is maintained, so that the microprocessor 14 controls interval W such that the larger the number of pulses generated, the longer the maintaining interval.

Processing is executed in accordance with a flow chart of FIG. 8. However, basic operation is the same as the first embodiment and there are differences in steps 161-167. The main routine and interrupt routines are basically the same as the first embodiment. The only different portions are described hereinbelow.

In FIG. 8, after processing of steps 117, 118, 119, and 120, steps 163, 164, 165, and 167 are added respectively. In these steps, the microprocessor 14 set the time count to W1-Wn, respectively. On the other hand, step 161 is provided between steps 112 and 113. A decision is made in step 162. These steps detect when the interval for maintaining a determined input power has passed. Thus, input power determined in steps 117-120 is maintained for interval W1-Wn in accordance with the number of dust particles.

Figure 9:
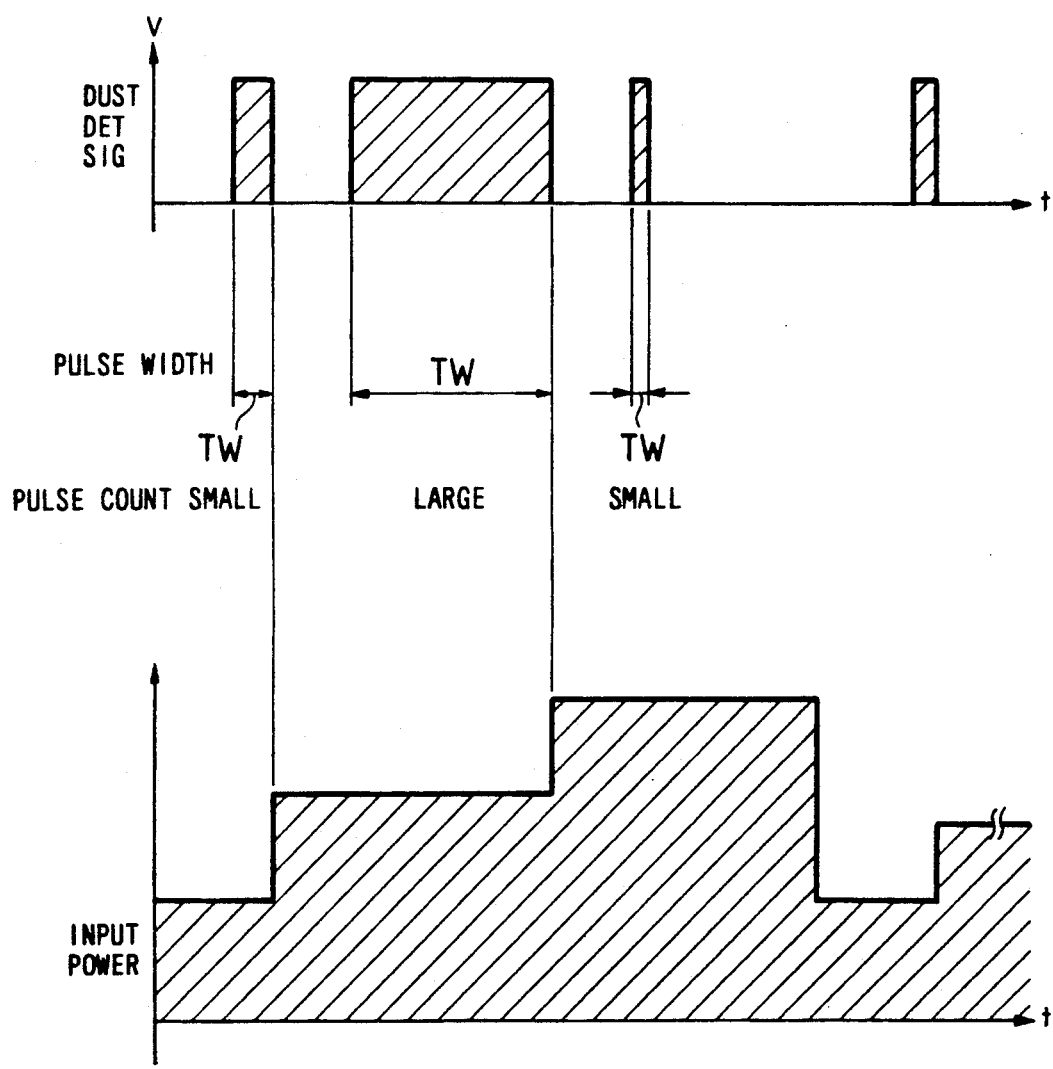
FIG. 9 shows waveforms for controlling input power of blower motor of a third embodiment.

FIG. 9 shows control of a third embodiment of the invention. The microprocessor 14 changes preset values of input power for the blower motor 16 by detecting pulse width and the number of pulses of the pulse signal generated by the dust detection circuit 13, the pulse width varying in accordance with size of dust.

In other words, input power for the blower motor 16 is set in accordance with the number of detected pulses generated for a given interval T. The number of dust particles is compensated by pulse width information. For example, the number n of detected pulses is multiplied by a pulse width compensation factor k. The result is used for setting input power of the blower motor 16. For example, when a dust particle of large size is sucked and a pulse with large width is detected, the number of pulses detected is compensated by information of the pulse width, so that the number of pulses is set to the equivalents of several pulse counts. Thus, suction force is increased considerably, so that a large suction force is effected for a large size dust particle.

Figure 10:
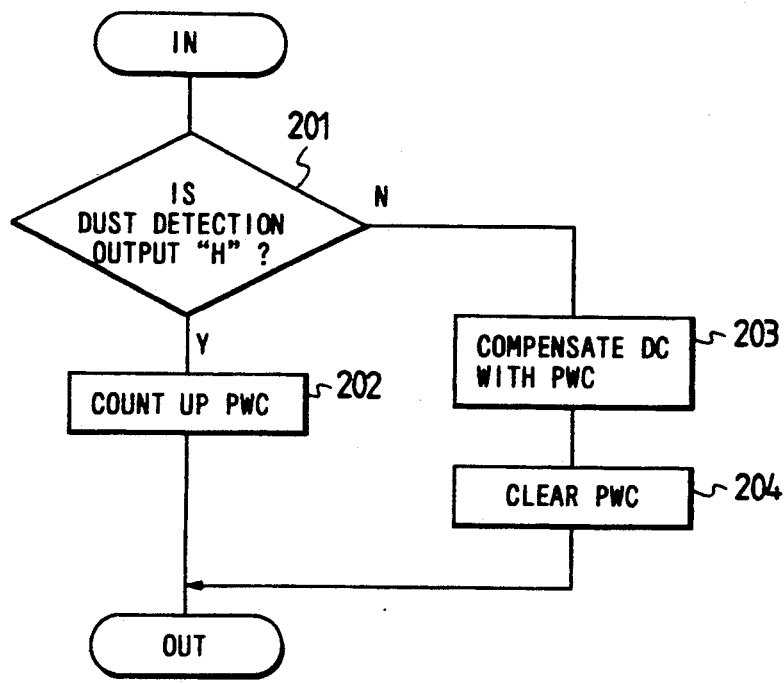
FIG. 10 shows a partial flow chart of the third embodiment.

Basic processing is carried out according to the flow chart of FIG. 6A and the processing shown in FIG. 10 of a flow chart is executed between steps 112 and 113 of FIG. 6A. The basic operation is the same as the first embodiment. Only the portion that is different is described hereinbelow.

Processing starts at step 201 followed by step 112. In step 201 a decision is made as to whether dust detection output signal is H. If the dust detection signal is H. processing proceeds to step 202. In step 202 the microprocessor 24 increases a count PWC which indicates pulse width because during H step of the dust detection signal, this count is increased at every zero-cross interrupt. Processing proceeds to step 112 of FIG. 6A. In step 201, if the dust detection signal is L, processing proceeds to step 203. In step 208, the microprocessor 14 compensates the dust count DC with the count PWC of pulse width count. For example, the number n of detected pulses is multiplied by pulse width compensation factor k. In the following step 204 the microprocessor 14 clears count PWC.

Figure 11:
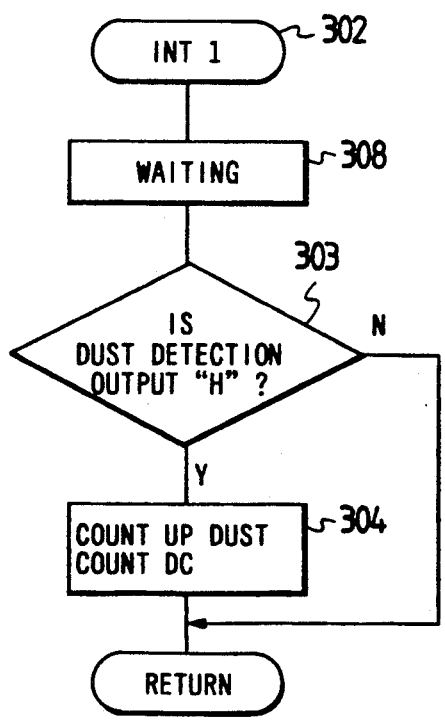
FIG. 11 shows a partial flow chart of the fourth embodiment.

FIG. 11 shows a fourth embodiment of the invention. The flow chart of FIG. 11 is used in place of the flow chart of FIG. 6B. Thus, the main routine and other interrupt routines are the same as the first embodiment. In FIG. 11, in response to the dust detection signal, interrupt processing starts. In step 302, an interrupt is performed. The interval of the interrupt is several milliseconds. Then, in next, step 303, the microprocessor 14 detects whether the dust detection signal is H or L. If the dust detection signal is H. the detection signal is true. Thus, in the following step 304, the microprocessor 14 counts the dust count DC. On the other hand, if the dust detection signal is L, the detected signal is not true, i.e.. a noise. Thus, the counting of dust is not performed and processing returns to the main routine directly.

Figure 12A:
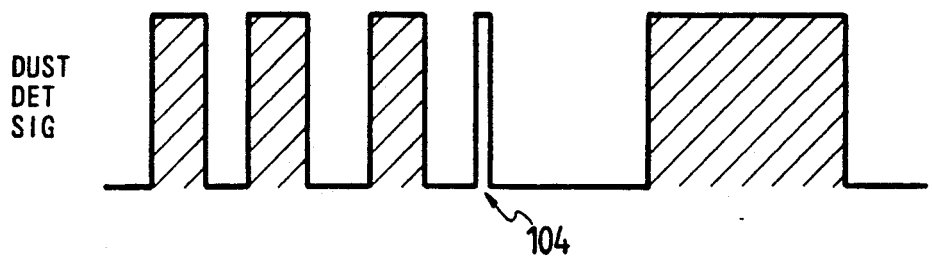
FIGS. 12A and 12B show waveform for removing noise component of the third embodiment.
Figure 12B:
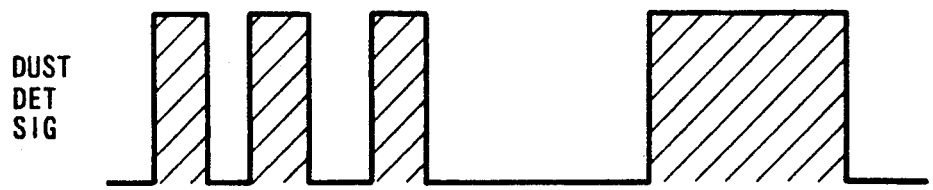

FIG. 12A shows a waveform of a dust detection signal In FIG. 12B, a noise component detected by comparator 11 in FIG. 12A is removed.

Figure 13A:
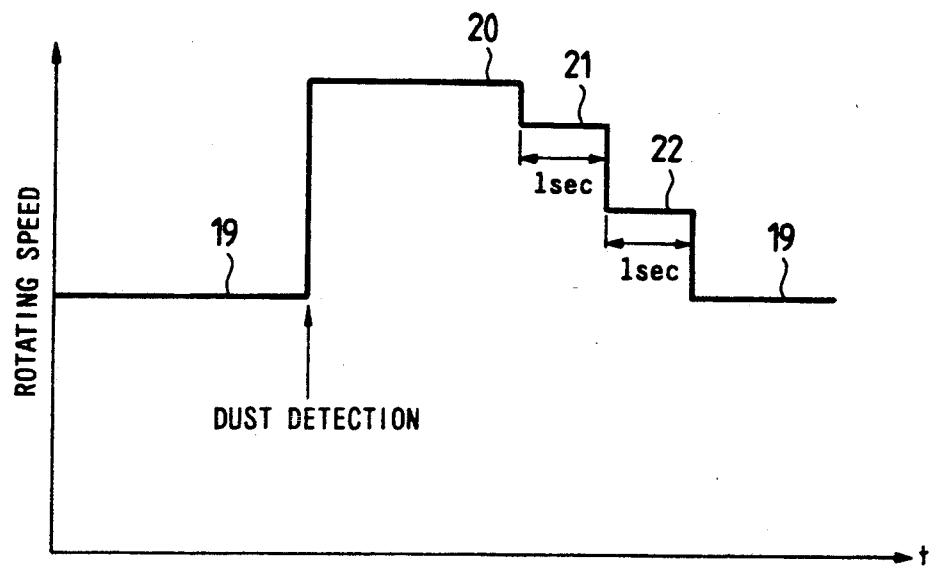
FIG. 13A and 13B are explanatory diagrams showing rotation speed control of a fifth embodiment.
Figure 13B:
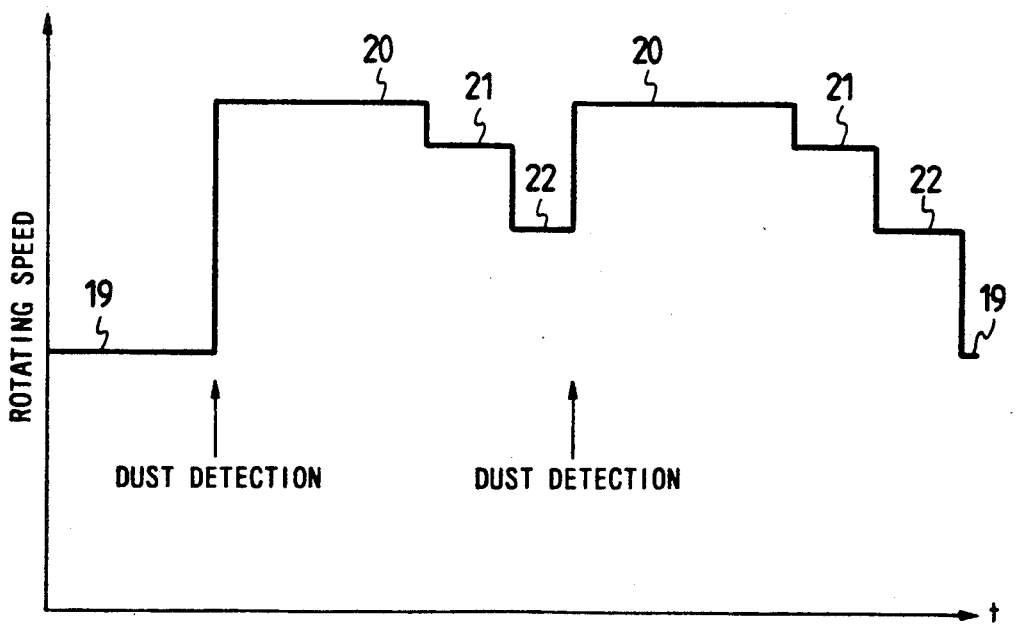

FIGS. 13A and 13B show control of a fifth embodiment of the invention. In a vacuum cleaner of the fifth embodiment, to recover its rotating speed to the rotating speed set prior to the detection of dust, a stepwise slowing down of the rotation speed is effected. Accordingly, the rotating speed is changed at every predetermined intervals by a given predetermined value to gradually return to the initial rotating speed. In FIG. 13A, when dust is detected, the rotating speed of the blower motor 16 is increased to a level 20 from an initial rotating speed 19. After a predetermined interval, for example one second, has passed, the rotating speed is decreased to a level 21. Next, after the rotating speed is maintained for a second interval, for example one second,. the rotating speed is further decreased to a level 22. The rotating speed is returned to the initial level 10 one second after. In other words, in this embodiment, the microprocessor 14 controls the rotating speed such that the rotating speed is changed from an initial value to another value; then maintains the another value for a given interval; and further repeatedly changes the rotating speed from the another value to yet another given value for each given intervals until the rotating speed returns to the initial value.

Moreover, as shown in FIG. 13B. if dust is detected within the interval where the rotating speed is maintained at the level 22, it is possible to increase the rotating speed to level 20 again.

Figure 14:
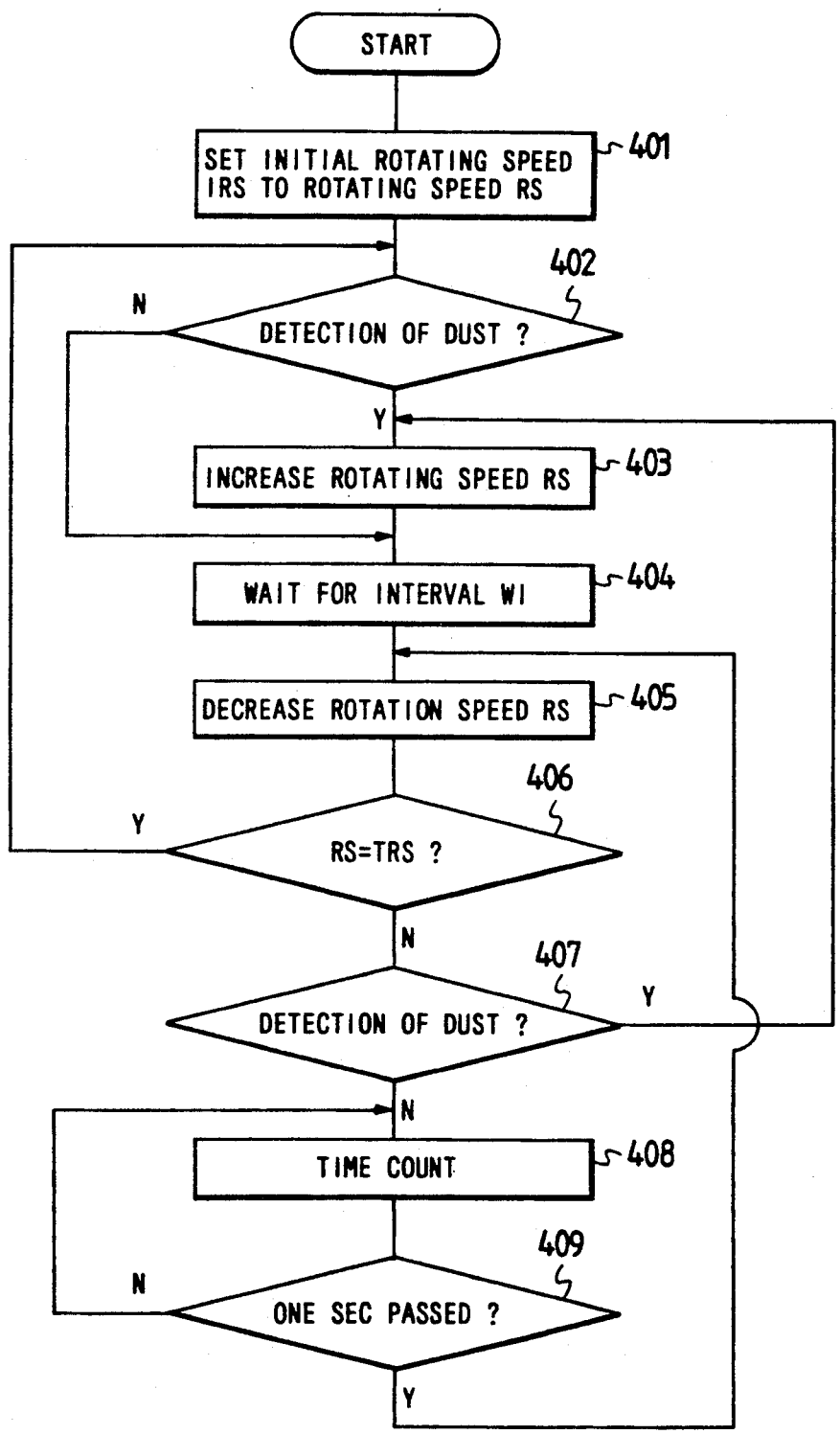
FIG. 14 shows a flow chart of the fifth embodiment.

FIG. 14 shows a flow chart for realizing the above-mentioned embodiment. Processing starts at step 401 when an operator turns on the vacuum cleaner after initializing (not shown) step is executed. In step 401, the microprocessor 14 sets initial rotating speed IRS to a rotating speed RS. Next, in step 402, a decision is made as to whether a dust particle is detected. If a dust particle is detected, processing proceeds to step 403. In step 403, the microprocessor 14 increases rotating speed RS Next, in step 404, processing waits for interval WI. i.e., one second. If a dust particle is not detected, processing proceeds to step 404 directly. In the following step 405, the microprocessor 14 decreases rotating speed RS. Next, in step 406 a decision is made as to whether rotating speed RS is equal to the initial rotating speed. If rotating speed RS is equal to the initial rotating speed, processing proceeds to step 402. If rotating speed RS is not equal to the initial rotating speed, processing proceeds to step 407. In step 407, the microprocessor 14 detects dust. If there is no dust, waiting of one second is performed in steps 408 and 409. When one second has passed, processing proceeds to step 405 and decreases rotation speed again. This routine is repeated until rotating speed RS equals the initial rotating speed. Rotating speed is controlled by steps 111 of zero-cross interrupt shown in FIG. 6A and interrupt INT1 of FIG. 6B and basic structure is shown in FIG. 4.

Figure 15:
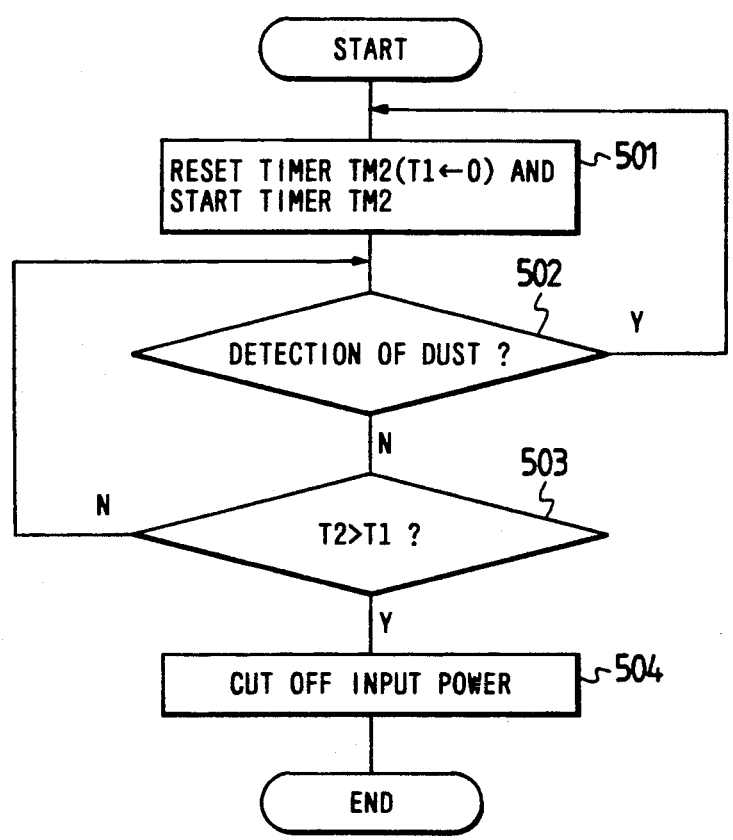
FIG. 15 shows a flow chart of the sixth embodiment.

FIG. 15 shows a sixth embodiment of the invention. The microprocessor 14 turns off input power of the blower motor 16 shown in FIG. 4 by a controlling gate of the thyristor 15 when the dust detection circuit 18 does not detect dust for a given interval. Processing is executed in accordance with a flow chart of FIG. 15. In FIG. 15, processing starts in step 501 where the microprocessor 14 resets and starts a timer TM2 provided in the microprocessor 14. In the following step 502, a decision is made as to whether dust is detected. If dust is detected, processing returns to step 501. If dust is not detected, processing proceeds to step 503. In step 503, a decision is made as to whether time interval T2 exceeds a predetermined value T1. If time interval T2 exceeds the predetermined value T1, the microprocessor 14 cuts off input power of the blower motor 10. If time interval T2 does not exceed the predetermined value T1, processing returns to step 502. As mentioned above, in the vacuum cleaner of the sixth embodiment, input power of the blower motor 16 is turned off if dust is not detected for a given time interval.

Figure 16:
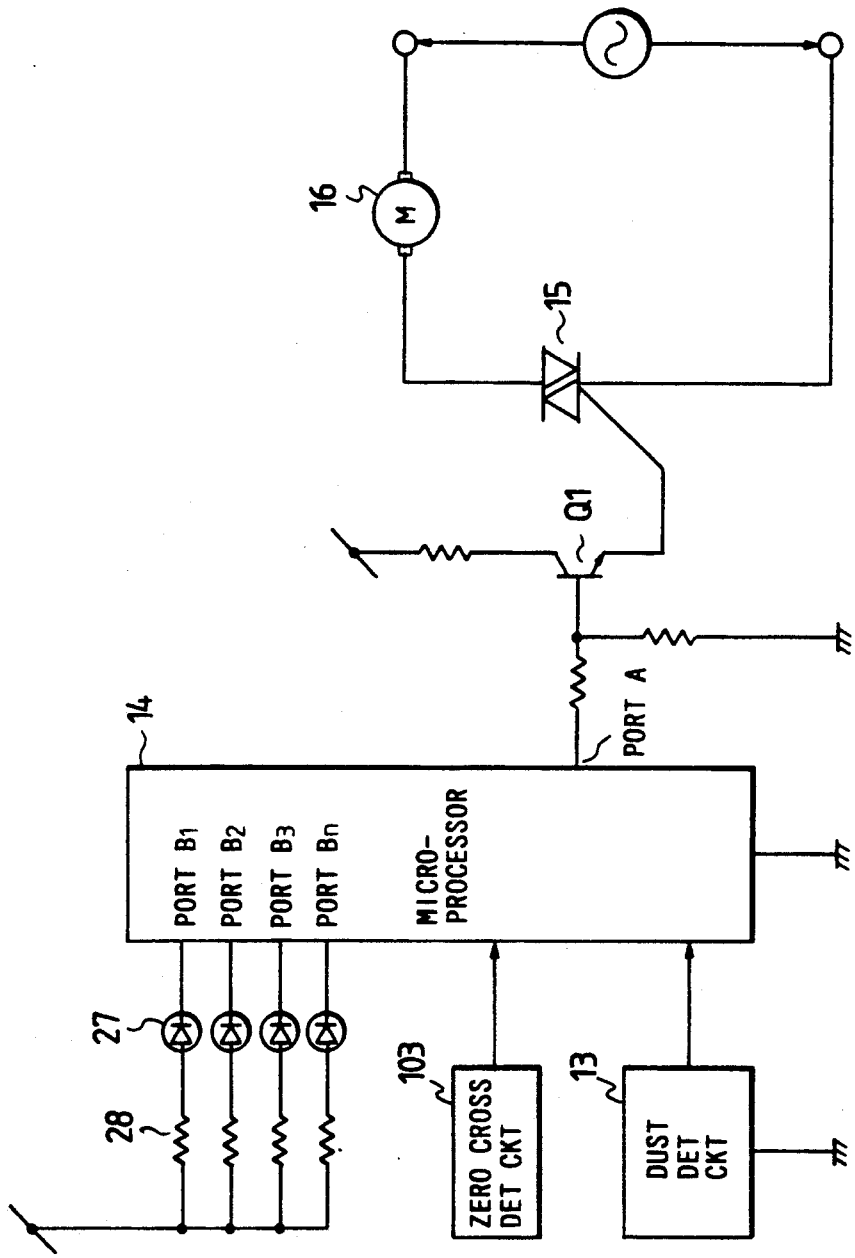
FIG. 16 is a block diagram of the seventh embodiment.
Figure 17:
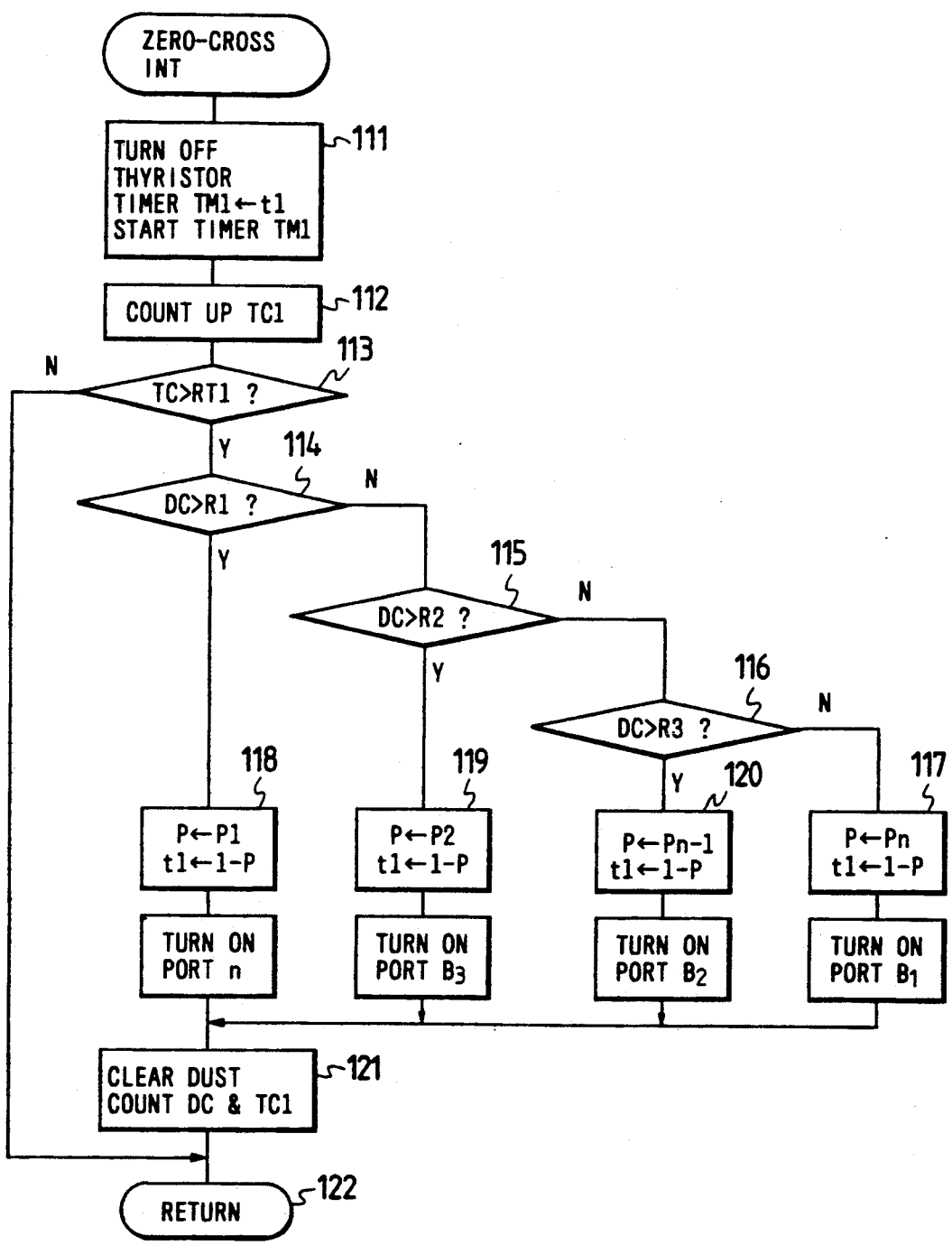
FIG. 17 shows a flow chart of the seventh and eighth embodiments.

FIG. 16 shows a seventh embodiment of the invention. In FIG. 16, the basic structure of the seventh embodiment is the same as that of the first embodiment. There is a difference that plural indication elements (LED) 27 are connected to ports $B_1-B_n$ respectively, of the microprocessor 14. The indication elements 27 are supplied with dc current through current limiting resistors 28. Processing of this embodiment, shown in FIG. 17, is basically the same as that of the first embodiment. There is a difference that after steps 117-120, the microprocessor 14 turns on either ports $B_1-B_n$ in accordance with dust count DC through judging steps 114-116. Therefore, the degree of the dust count is indicated by the indictors 27 to show degree of uncleanliness of the floor, i.e., dust amount.

Figure 18:
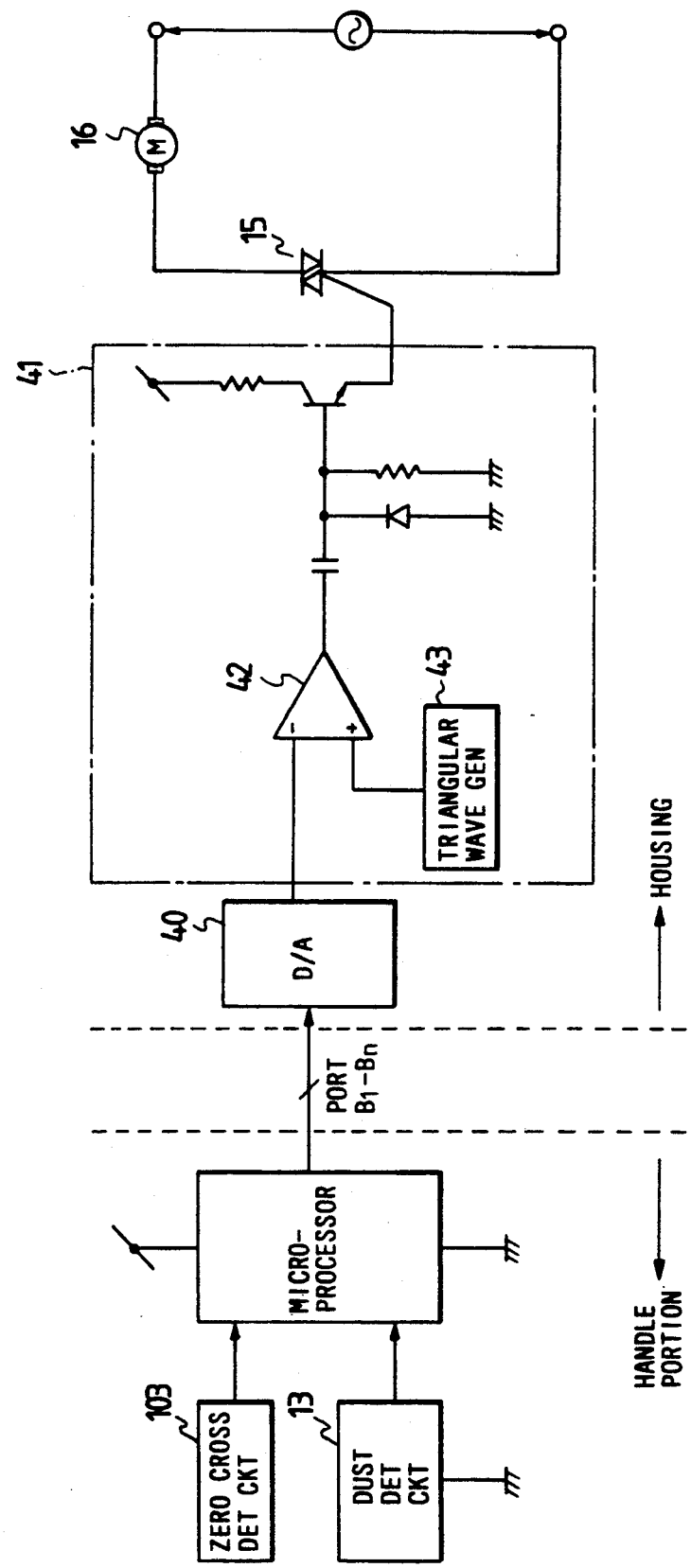
FIG. 18 is a block diagram of the eighth embodiment.

FIG. 18 shows an eighth embodiment of the invention. The structure of this embodiment is basically the same as that of the seventh embodiment. There is a difference that the thyristor 15 is controlled by the microprocessor 14 through a power control circuit 41 and the output port B is connected to a D/A converter. Thus, the microprocessor 14 outputs dust count DC at the output port B of the microprocessor 14 similar to the seventh embodiment The dust count DC of digital signal is converted into analog signal by the D/A converter 40. The output of the D/A converter is compared with a triangular wave from a triangular wave generator 43 by a comparator 42. Output of the comparator controls the duty of turning on the thyristor 15. The microprocessor 14 executes the process shown in FIG. 17 in response to zero-cross detection circuit 13 and the dust detection circuit 13. In the seventh embodiment, dust count outputted at the port B of the microprocessor 14 is used for indication of dust. On the other hand, in the eighth embodiment, the output signal of the ports $B_1-B_n$ is used for controlling of the thyristor 15. The above-mentioned structure is provided for by separating a driving unit from a control unit. The driving unit comprises the D/A converter 40, power control circuit 41 and the thyristor 15 and blower motor 16 provided to a housing. The control unit comprises the microprocessor 14, dust detection circuit 13, and zero-cross detection circuit 17 provided in a handle portion of the vacuum cleaner.

What is claimed is:

1. A vacuum cleaner comprising:
   (a) a blower motor;
   (b) dust detection means having a light emitting portion for emitting a light and a light sensitive portion for receiving the light from said light emitting portion, said light sensitive portion and light emitting portion being arranged to effect a light path therebetween across a portion of a suction passage, said dust detection means detecting interceptions of said light path by at least one dust particle crossing said light path to produce a dust detection signal;
   (c) dust amount detection means responsive to said dust detection signal from said dust detection means for detecting a relative dust amount by counting the number of said interceptions for a given interval; and
   (d) input power controlling means responsive to an output signal of said dust amount detection means for controlling input power provided to said blower motor in accordance with said number.

2. A vacuum cleaner as claimed i claim 1, wherein said input power controlling means further comprises storing means for storing plural preset input power values and selecting means for selecting an input power value from said plural preset input power values in accordance with said number.

3. A vacuum cleaner as claimed in claim 1, wherein said input power controlling means further comprises means responsive to said dust detection signal for maintaining said input power for an interval determined by said the number.

4. A vacuum cleaner as claimed in claim 1, wherein said dust detection means ignores said dust detection signal when the pulse width of said dust detection signal is shorter than a given value.

5. A vacuum cleaner as claimed in claim 1, wherein said input power controlling means controls said input power for changing the rotating speed of said blower motor from an initial value to another value, then maintaining said another value for a second given interval, and further repeatedly changing said rotating speed from said another value by a given value at every said second given interval until said rotating speed returns to said initial value.

6. A vacuum cleaner as claimed in claim 1, wherein said input power controlling means cuts off said input power when no pulse of said dust detection signal is inputted thereto for a third given interval.

7. A vacuum cleaner as claimed in claim 1, further comprising indicating means responsive to said dust detection signal for indicating the degree of detection of dust in accordance with said number.

8. A vacuum cleaner comprising:
(a) a blower motor;
(b) dust detection means having light emitting portion for emitting a light and a light sensitive portion for receiving the light from said light emitting portion, said light sensitive portion and said light emitting portion being arranged to effect a light path therebetween across a portion of a suction passage, said dust detection means detecting the number of interceptions of said light path by at least one dust particle crossing said light path to produce a dust detection signal;
(c) pulse width detection means responsive to said dust detection signal from said dust detection means for detecting the pulse width of said dust detection signal to produce an output signal; and
(d) input power controlling means responsive to said output signal from said pulse width detection means and said number of interceptions from said dust detection signal for controlling input power provided to said blower motor.

9. A vacuum cleaner as claimed in claim 8, wherein said dust detection means produces said dust detection signal when the pulse width of said dust detection signal is larger than a given value.

10. A vacuum cleaner as claimed in claim 8, wherein said input power controlling means changes the rotating speed of said blower motor from an initial value to another value, then maintains said another value for a second given interval, and further repeatedly changes said rotating speed from said another value by a given value at every said second given interval until said rotating speed returns to said initial value.

11. A vacuum cleaner as claimed in claim 8, wherein said input power controlling means cuts off said input power when no pulse of said dust detection signal is inputted thereto for a third given interval.

12. A vacuum cleaner comprising:
(a) a blower motor;
(b) dust detection means having a light emitting portion for emitting a light and a light sensitive portion for receiving a light from said light emitting portion, said light sensitive portion and said light emitting portion being arranged to effect a light path therebetween across a portion of a suction passage for detecting interceptions of said light path by at least one dust particle crossing said light path to produce a dust detection signal;
(c) dust amount detection means responsive to said dust detection signal form said dust detection means for detecting a density of dust passing through said suction passage by counting the number of said interceptions for a given interval;
(d) pulse width detection means responsive to said dust detection signal from said dust detection means for detecting the width of a pulse caused by said dust particle passing said portion; and
(e) input power controlling means comprising modify means responsive to output signals of said dust amount detection means and said pulse width detection means for controlling input power provided to said blower motor in accordance with said number modified by said width.

13. A vacuum cleaner as claimed in claim 12, wherein said dust detection means ignores said dust detection signal when the pulse width of said dust detection signal is shorter than a given value.

14. A vacuum cleaner as claimed in claim 12, wherein said input power controlling means changes the rotating speed of said blower motor from an initial value to another value, then maintains said another value for a second given interval, and further repeatedly changes said rotating speed from said another value by a given value at every said second given interval until said rotating speed returns to said initial value.

15. A vacuum cleaner as claimed in claim 12, wherein said input power controlling means cuts off said input power when no pulse of said dust detection signal is inputted thereto for a third given interval.

16. A vacuum cleaner comprising:
(a) a housing having:
(I) a blower motor; and
(II) input power controlling means responsive to a control signal for controlling input power provided to said blower motor; and
(b) a handle portion having:
(III) dust detection means having a light emitting portion for emitting a light and a light sensitive portion for receiving a light from said light emitting portion, said light sensitive portion and said light emitting portion being arranged to effect a light path therebetween across a portion of a suction passage for detecting interceptions of said light path by at least one dust particle crossing said light path to produce a dust detection signal;
(IV) dust amount detection means responsive to said dust detection signal from said dust detection means for detecting a relative dust amount by counting the number of said interceptions for a given interval to produce said control signal indicative of said number.

17. A vacuum cleaner as claimed in claim 16, wherein said input power controlling means further comprising storing means for storing plural preset input power values and selecting means for selecting an input power value from said plural preset input power values.

18. A vacuum cleaner comprising:
a blower motor;

dust detection means responsive to at least one dust particle for detecting a density of dust passing through a suction passage of said vacuum cleaner, said dust particle passing through a portion of said suction passage to produce a dust detection signal;

comparing means for comparing said dust detection signal of said dust detection means with at least two different reference values to produce a control signal; and input power controlling means responsive to said control signal for setting the level input power provided to said blower motor to one of at least three different given values.

19. A vacuum cleaner comprising:

a blower motor;

dust detection means responsive to at least one dust particle for detecting a density of dust passing through at least one portion of a suction passage of said vacuum cleaner to produce a dust detection signal;

pulse width detection means responsive to said dust detection signal for detecting the pulse width of said dust detection signal to produce an output signal;

comparing means for comparing said output signal to said pulse width detection means with at least two different reference values to produce a control signal; and input power controlling means responsive to said control signal for providing to said blower motor an input power level having, at any one time, one of at least three different given values.

20. A vacuum cleaner comprising:

a blower motor;

dust detection means responsive to at least one dust particle for detecting a density of dust passing through at least one portion of a suction passage of said vacuum cleaner to produce a dust detection signal;

pulse width detection means responsive to said dust detection signal for detecting the pulse width of said dust detection signal; and modifying means for modifying said dust detection signal with said pulse width to provide an output signal;

comparing means for comparing said output signal of said modifying means with at least two different reference values to produce a control signal; and input power controlling means responsive to said control signal of said pulse width detection means for providing to said blower motor an input power level having, at any one time, one of at least three different given values.

21. A vacuum cleaner comprising:

(a) a housing having:

(I) a blower motor; and (II) input power controlling means responsive to a control signal for providing input power having, at any one time, one of at least three different given values to said blower motor; and (b) (III) dust detection means responsive to at least one dust particle for detecting a density of dust passing through at least one portion of a suction passage of said vacuum cleaner to provide an output signal; and (IV) comparing means for comparing said output signal of said dust detection means with at least two different reference values to produce a control signal.

* * * * *